July 31, 1962 W. H. GUNTHER, JR 3,047,080
AIR TRANSPORTABLE DRILL FRAME
Filed Sept. 8, 1958 2 Sheets-Sheet 1
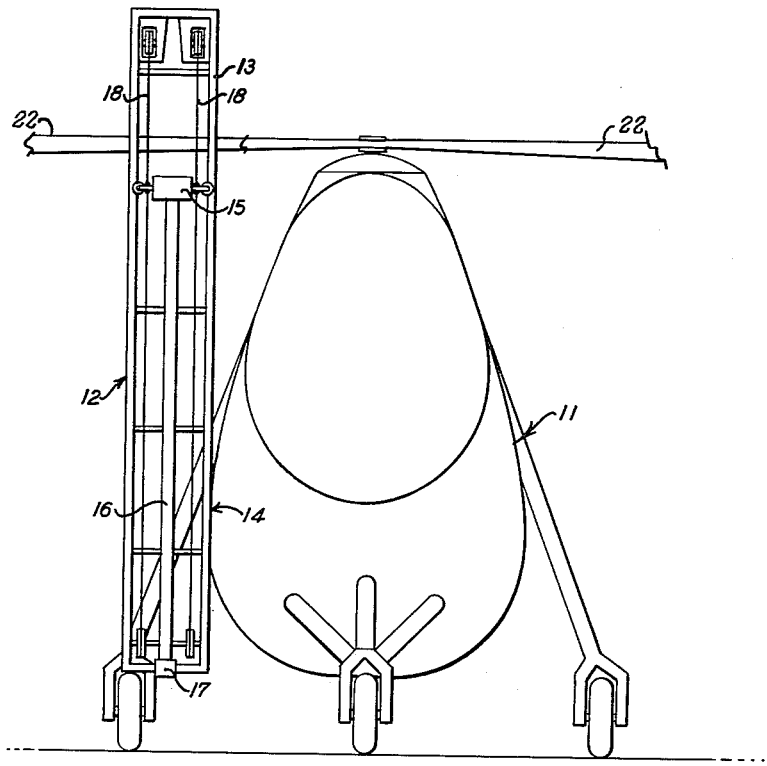
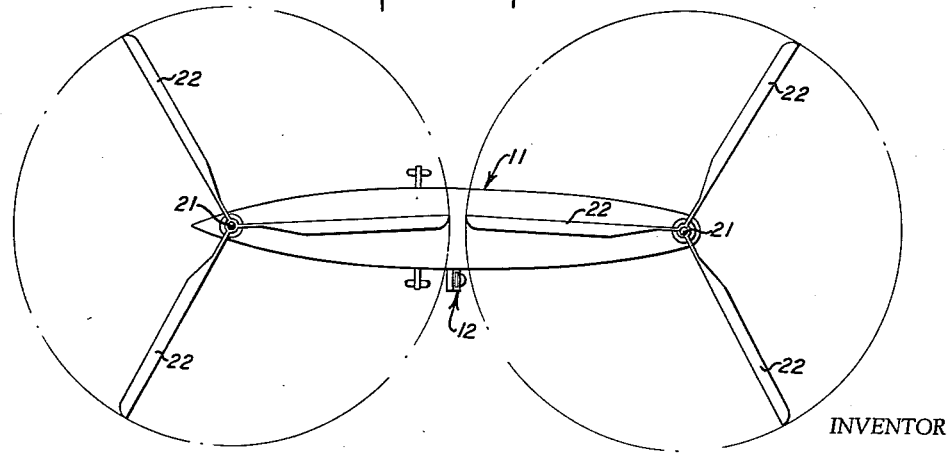
INVENTOR
WILLIAM H. GUNTHER, JR.
BY
ATTORNEY July 31, 1962 W. H. GUNTHER, JR 3,047,080
AIR TRANSPORTABLE DRILL FRAME
Filed Sept. 8, 1958 2 Sheets-Sheet 2
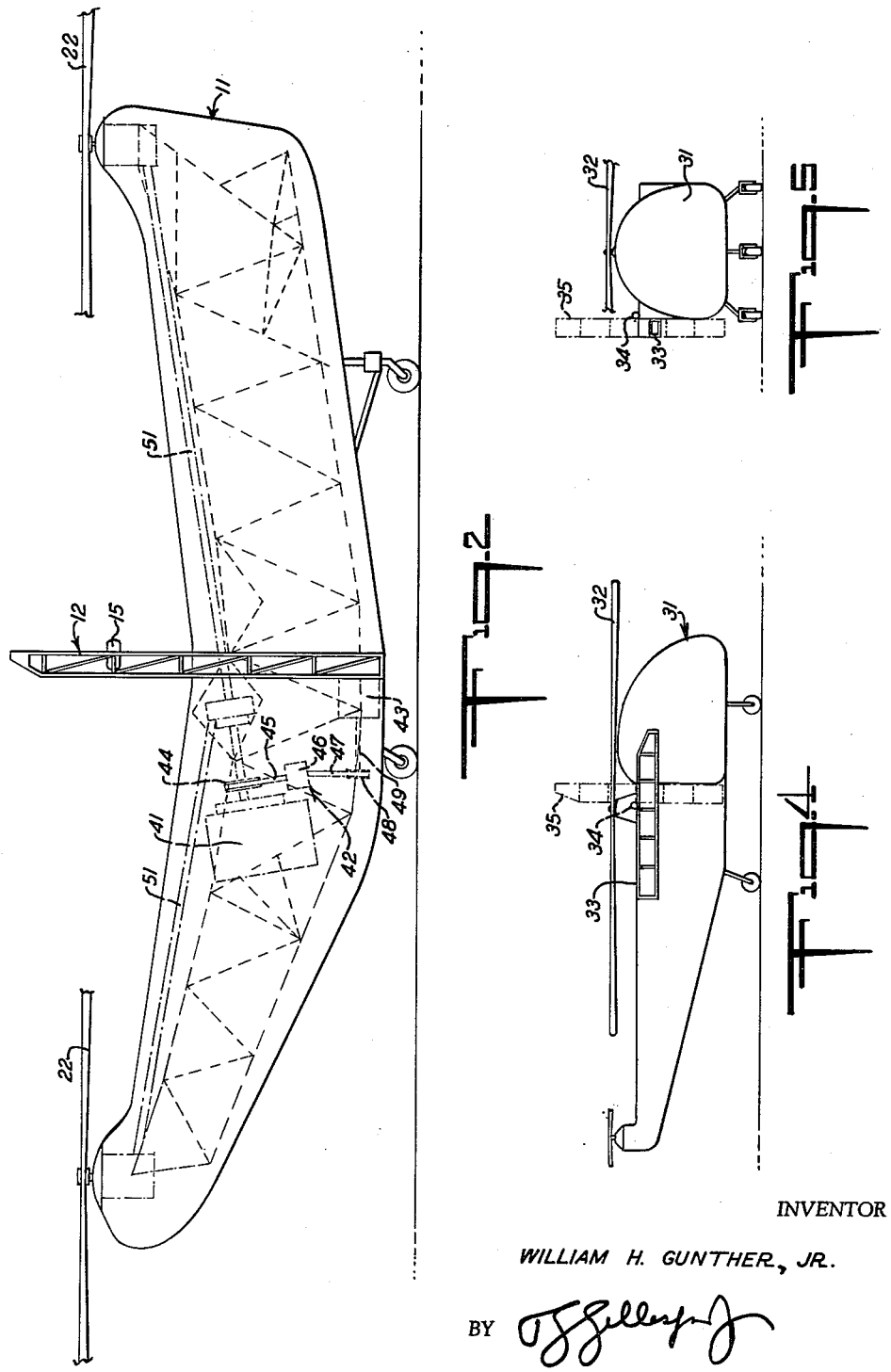
INVENTOR
WILLIAM H. GUNTHER, JR.
BY
ATTORNEY

United States Patent Office 3,047,080
Patented July 31, 1962

3,047,080
AIR TRANSPORTABLE DRILL FRAME
William H. Gunther, Jr., Greenwich, Conn., assignor to Indair, Inc., New York, N.Y., a corporation of Delaware
Filed Sept. 8, 1958, Ser. No. 759,650
2 Claims. (Cl. 175—201)

This application is concerned with helicopters and their use in seismographic exploration work. More particularly, the present invention is concerned with the combination of a helicopter and drill means, which drill means obtain power from the power source of the helicopter.

The present invention broadly embraces a helicopter having drill means integrally attached thereto, said drill means being disposed to permit drilling substantially parallel to the axes of rotation of said rotors and means for transmitting power from the power source of said helicopter to said drill means.

In another embodiment, the present invention embraces a helicopter having drill means integrally attached thereto, the boom of said drill means being pivotal to permit drilling substantially parallel to the axis of the rotation of the rotor of said helicopter and disposition of said boom in the plane parallel to the plane of rotation of said rotor and means for transmitting power from the power source of said helicopter to said drill means.

In still another embodiment, the present invention embraces a tandem rotor helicopter having drill means integrally attached thereto, said drill means being disposed to permit drilling substantially parallel to the axes of said rotation of said rotors and means for transmitting power from the power source of said helicopter to said drill means.

It will be realized that the present invention provides a cooperative assembly of helicopter, drill means and power source which produces results heretofore unobtainable. For example, previously, difficulty has been encountered in transporting drill rigs used in seismographic exploration work because the drill means had, as an integral part thereof, a power source which added weight and thus limited the size of drill rig which could be transported by helicopter. Additionally, in the present combination, the entire weight of the helicopter is utilized to create bearing pressure on the drill. As the weight of the helicopter is considerably in excess of the weight of the previously used drill rig, even including the weight due to the power source means, it is seen that the present invention provides distinct advantage in this regard.

The present invention is illustrated schematically in the drawings, in which FIGURE 1 is a front view of a tandem rotor helicopter showing the drill rig attached to the helicopter. FIGURE 2 is a side view of the helicopter of FIGURE 1 and illustrates the power source means of both the helicopter and drill means. FIGURE 3 is a plan view of the helicopter of FIGURE 1. FIGURES 4 and 5 are, respectively, side and front views of a single rotor helicopter, showing the drill means attached.

Referring to FIGURE 1, there is shown the helicopter 11 and the drill means 12. The drill boom 13 is integrally attached to the helicopter 11 at position designated 14. This can be by coupling the boom 13 with the fuselage of the helicopter 11 by such means as, for example, welding to the fuselage of helicopter 11, or by bolting, riveting or like means.

The boom 13 supports the rotary 15, to which is attached the drill pipe 16, which moves vertically with respect to the boom 13 and to which is attached the rotary drill bit 17 and the draw works 18. In the schematic representation of FIGURE 1, the hydraulic hoses, which supply power to the rotary 15, are not shown, nor is there shown the drill means power source.

FIGURE 3 illustrates the positioning of the drill means 12 with respect to the helicopter 11 and the axes of rotation 21 of the rotor blades 22. In this illustration the rotor blade paths are spaced apart in such manner that the drill means 12 can remain in a fixed position with respect to the helicopter when the helicopter is in flight. It will be realized that on tandem rotor helicopters which have overlapping blade paths, the drill means 12 can be pivotally mounted so that when the helicopter is to be flown it can be pivoted out of the paths of the rotor blades. This feature is illustrated with respect to a single rotor helicopter in FIGURES 4 and 5. Therein is shown a helicopter 31 having a rotor 32, to which there is attached a drill means 33, which is shown in a position for flight. The drill means 33 is pivoted on axis 34, and when in position for drilling is as shown by the dotted line drill means 35.

In the combination of the present invention utilizing a single rotor helicopter, it will be realized that the position of the drill means with respect to the axis of rotation of the rotor blade is necessarily such that the drill means, when in position for drilling, intersects the rotor blade path. Thus, the drill means is pivoted into the position, as shown in FIGURE 4, for flight.

Referring to FIGURE 2, there is shown the helicopter 11, the drill means 12, which derives its power from the power source 41 of the helicopter 11 via the power transmitting means 42, which supplies power to the hydraulic means 43, which, in turn, powers the rotary 15 and the draw works 18 as shown in FIGURE 1. As illustrated in FIGURE 2, the power transmitting means can comprise a pulley 44 and belt 45, cooperating with a reduction gear box 46, a second belt 47, which drives a second pulley 48, which transmits power via shaft 49 to the hydraulic power means 43. It will be realized that this is merely an illustration of the power transmission means 42 and that the present invention is not limited to this specific embodiment, but rather embraces broadly power transmitting means from the helicopter power source to the power source of the drill means. While the drill means power source 43 has been denominated a hydraulic power means, the present invention contemplates utilization of direct power, such as, for example, chain drives or electrical drive powered by electricity generated by use of the helicopter power source.

FIGURE 2 further illustrates the drive shafts 51, which transmit power from the helicopter power source 41 to the rotors 21.

It is to be noted that when a single rotor helicopter is used in an embodiment of the present invention, that the boom is pivotally mounted in such manner that it is in a vertical position when operated as a drill and folded in such manner that it does not intersect the rotor blade path when the helicopter is in flight. Similarly, when a tandem rotor helicopter having blade paths which are separated by a distance at least equal to the size of the drill boom is utilized, then the drill boom need not be pivotally mounted but can actually be maintained in drilling position while in flight.

The present invention enables performance of seismographic exploration work in places heretofore inaccessible either because of terrain or because of restrictions on passage of vehicles. The area which can be seismographically explored within a unit time utilizing the present invention is at least two to three times the area explorable per unit time utilizing previously known methods.

It will be realized that the present invention enables and embraces an improved method of seismographic exploration. This method comprises the improvement of utilizing a drill-carrying helicopter, as above described, in combination and cooperation with one or more helicopters adapted to transport the seismographic information receiving, recording and developing means in a single unit and the seismographic cable of a size and weight necessary to enable collection of data capable of on-site development to provide profiles of greatest accuracy and detail obtainable.

In such seismographic exploration work, the drill-carrying helicopter drills one or more shot holes, depending upon the particular area being explored, a second helicopter positions the data receiving means with respect to the shot hole being drilled by the drill-carrying helicopter, and a third helicopter positions the seismographic cables with respect to both the shot hole and the seismographic data receiving means.

By the cooperation of these three helicopter units, it is possible to seismographically explore a greater area per unit time than possible utilizing heretofore-known means. Additionally, utilizing this combination enables obtention of profiles of the highest accuracy and detail at a much more rapid rate than heretofore possible.

A further feature resides in the fact that, utilizing the aforedescribed combination, which enables development of profiles of the character above described on the site, it is possible to immediately determine whether or not a particular seismographic profile is satisfactory. In the event it is not, it is possible, utilizing the present invention, immediately to repeat the shot and obtain a new and satisfactory profile. Heretofore utilizing methods which required processing of the data other than on site in order to obtain a profile, it was sometimes necessary, when an unsatisfactory profile had been obtained, to relocate equipment at some later date and attempt to obtain a satisfactory profile. This has been eliminated by use of the present invention.

Further, as stated above, the drill-carrying helicopter, particularly in combination with the above-described combination of helicopters, enables exploration of terrains heretofore unexplorable.

In view of the foregoing disclosures, variations and modifications thereof will be apparent to one skilled in the art and it is intended to include within the invention all such variations and modifications except as do not come within the scope of the appended claims.

What is claimed is:
1. An apparatus for positioning a drill rig and drilling a hole therewith in a predetermined area for seismographic exploration which comprises: a helicopter having a fuselage and at least one rotor; a drill rig affixed to the middle portion of said fuselage; a rotary drill bit contained within said drill rig; a first and second support means affixed to said fuselage afore and aft said middle portion and adapted to support said fuselage; a power source contained within said fuselage; a first transmission means adapted to transmit power from said power source to said rotor, while positioning said helicopter and said drill rig in said predetermined area, said drill rig being outside the path of said rotor during said positioning; a second transmission means adapted to transmit power from said power source to said rotary drill bit after said drill rig is vertically positioned in said predetermined area; said first and second transmission means being adapted so that when one is in operation the other is inactive; said rotary drill bit being adapted to bore vertical holes while under the bearing pressure of said helicopter.

2. The apparatus of claim 1 wherein the drill rig is pivotably affixed to said fuselage thereby permitting rotation to a substantially horizontal position.

References Cited in the file of this patent
UNITED STATES PATENTS

| | | |
|---|---|---|
| 2,351,799 | Austin | June 20, 1944 |
| 2,403,456 | Pitcairn | July 9, 1946 |
| 2,539,220 | Athy et al. | Jan. 23, 1951 |
| 2,662,736 | Abrams | Dec. 15, 1953 |
| 2,665,116 | Brink et al. | Jan. 5, 1954 |
| 2,717,656 | Bannister | Sept. 13, 1955 |
| 2,721,617 | Piety | Oct. 25, 1955 |
| 2,734,722 | Pokorny | Feb. 14, 1956 |
| 2,856,156 | Young | Oct. 14, 1958 |
| 2,859,914 | Berner | Nov. 4, 1958 |

FOREIGN PATENTS

| | | |
|---|---|---|
| 736,695 | Great Britain | Sept. 14, 1955 |
| 245,311 | Switzerland | July 16, 1947 |